(12) United States Patent
Barth et al.

(10) Patent No.: US 10,612,950 B2
(45) Date of Patent: Apr. 7, 2020

(54) THERMAL, FLOW MEASURING DEVICE AND ARRANGEMENT WITH A TUBE OR PIPE AND THE THERMAL, FLOW MEASURING DEVICE

(71) Applicant: Endress+Hauser Flowtec AG, Reinach (CH)

(72) Inventors: Martin Barth, Riehen (CH); Alexander Grün, Lörrach (DE); Emioni Papadopoulou, Dornach (CH); Axel Pfau, Wehr (DE)

(73) Assignee: Endress+Hauser Flowtec AG, Reinach (CH)

( * ) Notice: Subject to any disclaimer, the term of this patent is extended or adjusted under 35 U.S.C. 154(b) by 231 days.

(21) Appl. No.: 15/769,175
(22) PCT Filed: Sep. 8, 2016
(86) PCT No.: PCT/EP2016/071201
§ 371 (c)(1),
(2) Date: Apr. 18, 2018
(87) PCT Pub. No.: WO2017/067699
PCT Pub. Date: Apr. 27, 2017

(65) Prior Publication Data
US 2018/0299307 A1    Oct. 18, 2018

(30) Foreign Application Priority Data
Oct. 23, 2015   (DE) .......................... 10 2015 118 120

(51) Int. Cl.
*G01F 1/684*    (2006.01)
*G01F 15/14*    (2006.01)
(Continued)

(52) U.S. Cl.
CPC ............ *G01F 1/6842* (2013.01); *G01F 1/684* (2013.01); *G01F 1/69* (2013.01); *G01F 15/14* (2013.01); *G01F 1/6965* (2013.01)

(58) Field of Classification Search
CPC ............. G01F 1/684; G01F 1/69; G01F 15/14
(Continued)

(56) References Cited

U.S. PATENT DOCUMENTS 5,369,990 A * 12/1994 Zurek .............. F02M 35/10019
                                                73/114.32
6,971,274 B2 * 12/2005 Olin ........................ G01F 1/684
                                                73/204.22
(Continued)

FOREIGN PATENT DOCUMENTS

DE       4310720 A1    10/1994
DE       19636095 A1    3/1997
(Continued)

OTHER PUBLICATIONS

Search Report for German Patent Application No. 10 2015 118 120.7, German Patent Office, dated Apr. 12, 2016, 7 pp.
(Continued)

*Primary Examiner* — Nimeshkumar D Patel
*Assistant Examiner* — Jean F Morello
(74) *Attorney, Agent, or Firm* — Mark A. Logan; PatServe

(57) ABSTRACT

The application discloses a thermal, flow measuring device comprising: a sensor including a metal sensor housing having a hollow body and a base; and at least first and second pin sleeves protruding from the base. In a first of the two pin sleeves a first heater is provided and in a second of the two pin sleeves a temperature sensor is provided for ascertaining a temperature of a medium. At least two elongated elements extend with at least the same length as the pin sleeves starting from the hollow body in parallel with the two pin sleeves. On a cutting plane perpendicular to the sensor axis another axis extends that is perpendicular to the connecting axis and wherein the separation of the elongated elements in their course parallel with the axis lessens in certain regions.

12 Claims, 6 Drawing Sheets

(51) Int. Cl.
*G01F 1/69* (2006.01)
*G01F 1/696* (2006.01)

(58) Field of Classification Search
USPC .......................................................... 73/202.5
See application file for complete search history.

(56) References Cited

U.S. PATENT DOCUMENTS

| | | |
|---|---|---|
| 2005/0241386 A1 | 11/2005 | Goka et al. |
| 2009/0260431 A1 | 10/2009 | Olin et al. |
| 2011/0048564 A1* | 3/2011 | Wible .................... G01F 1/6842 |
| | | 138/37 |
| 2011/0098943 A1 | 4/2011 | Pfau et al. |
| 2011/0252881 A1* | 10/2011 | Glatzel .................. G01F 1/684 |
| | | 73/204.23 |
| 2015/0192442 A1 | 7/2015 | Olin |

FOREIGN PATENT DOCUMENTS

| | | |
|---|---|---|
| DE | 20309694 U1 | 9/2003 |
| DE | 10245134 A1 | 10/2003 |
| DE | 102009045956 A1 | 4/2011 |
| DE | 102013223372 A1 | 5/2015 |

OTHER PUBLICATIONS

Search Report for International Patent Application No. PCT/EP2016/071201, WIPO, dated Nov. 24, 2016, 13 pp.

\* cited by examiner

THERMAL, FLOW MEASURING DEVICE AND ARRANGEMENT WITH A TUBE OR PIPE AND THE THERMAL, FLOW MEASURING DEVICE

CROSS-REFERENCE TO RELATED APPLICATIONS

The present application is related to and claims the priority benefit of German Patent Application No. 10 2015 118 120.7, filed Oct. 23, 2015 and International Patent Application No. PCT/EP2016/071201 filed on Sep. 8, 2016, the entire contents of which are incorporated herein by reference.

TECHNICAL FIELD

The present invention relates to a thermal, flow measuring device as defined in the preamble of claim 1 and to an arrangement with a tube or pipe and the thermal, flow measuring device.

BACKGROUND

Known are thermal, flow measuring devices, which have a sensor housing with two pin sleeves. Arranged in a first of these two pin sleeves is a heater, e.g. a heated resistance thermometer. Arranged in a second of these pin sleeves is a temperature sensor for ascertaining the temperature of the medium, which likewise can be embodied as a heatable resistance thermometer, which, however, in its operating state as a temperature sensor is not actively heated. By means of these two above-described sensor elements, a reliable flow measurement can occur.

For preventing measurement errors, it is expedient so to install the thermal, flow measuring device in a tube or pipe such that the flow of the measured medium, i.e. its flow direction, is perpendicular, thus at an angle of 90°, to a connecting axis, which is defined by the two pin sleeves. Therefore, the thermal, flow measuring device must be oriented very precisely, in order to avoid an angular offset from this ideal 90°-arrangement relative to the flow direction. This measurement error due to an angular offset is also referred to as the tilt angle sensitivity of a thermal, flow measuring device.

For lessening this tilt angle sensitivity, structural modifications were implemented in the product, t-mass 65 I, of the applicant. In the case of this construction, however, the installed position must be observed. The flow measuring device reliably ascertains the flow of a measured medium in a first flow direction and can compensate for an angular offset. There can, however, be situations, e.g. CIP-cleaning processes, rebounds of the measured medium or a controlled guiding of the measured medium in an opposite direction, which make a flow measurement in a second flow direction opposite to the first flow direction necessary. The property of a thermal, flow measuring device to be able to measure in the flow direction and in the opposite direction is referred to herein as bidirectionality.

A thermal, flow measuring device is additionally known from US 2015/0192442 A1. In this case, supplementally to the pin sleeves in FIGS. 1b and 2a two lateral, elongated elements are provided, which bring about a flow guidance. However, due to the flat nature of the elements elongated in parallel with the flow direction, the tilt angle sensitivity of the flow measuring device is only slightly improved.

SUMMARY

Starting from the aforementioned state of the art, an object of the present invention is to provide a bidirectional, thermal, flow measuring device having lesser tilt angle sensitivity.

The present invention achieves this object by a thermal, flow measuring device as defined in claim 1.

A thermal, flow measuring device of the invention includes a sensor with a metal sensor housing.

The metal sensor housing includes a hollow body for connecting to a plug-in apparatus and/or to a tube wall. A plug-in apparatus can be e.g. a framework, on whose end the aforementioned sensor housing is arranged. This framework is then inserted into the tube or pipe through an opening, which is most often located at the uppermost point of a tube or pipe with reference to the gravitational field. The wall of the sensor housing bounding on the environment is, thus, partially or completely exposed to a flow of a measured medium located in the tube or pipe. Alternatively to the plug-in apparatus, the metal sensor housing can also be affixed directly or by means of a tube or pipe lengthening securely to a tube or pipe wall. The type of seating of the sensor housing, or of the hollow body, is, however, only of subordinate meaning in the context of the present invention.

The aforementioned hollow body includes a base. This base can, for example, be flat or curved.

The sensor housing includes at least two pin sleeves, which protrude starting from the base and in the installed state protrude preferably into the interior of a tube or pipe. The pin sleeves can be embodied e.g. cylindrically or prismatically.

The pin sleeves define a connecting axis, on which the longitudinal axes of the two pin sleeves are arranged. At the center between the two longitudinal axes of the pin sleeves is located the midpoint of the connecting axis.

Arranged in the first pin sleeve, especially in a terminal section of this pin sleeve, is a first heater and arranged in the second pin sleeve, especially in a terminal section of this pin sleeve, is a temperature sensor for ascertaining the temperature of the medium.

Furthermore, the sensor housing includes at least two elongated elements having at least the same length as the pin sleeves. These extend in parallel with the two pin sleeves, starting from the hollow body.

On a fictive cutting plane, there extends perpendicular to the sensor axis A and perpendicular to the fictive connecting axis I another fictive axis II.

For lessening the tilt angle sensitivity according to the invention, the separation of the elongated elements lessens at least in certain regions in their course parallel to the aforementioned additional axis II. By lessening the separation of the elongated elements, a centering of the flow occurs. This centering can minimize the effect of an angular offset.

Further according to the invention, the sensor housing includes two planes, relative to which the sensor housing is constructed mirror symmetrically, at least in certain regions. The two planes are perpendicular to one another and perpendicular to the cutting plane. By mirror symmetric construction of the sensor housing with reference to the two aforementioned planes, a bidirectional flow measurement can occur, thus the registering of a flow both in a first flow direction and in an opposing, second flow direction.

Advantageous embodiments of the invention are subject matter of the dependent claims.

A mirror symmetric arrangement can in the context of the present invention be achieved, for example, by four elongated elements, of which two elongated elements are arranged in the flow direction before, and two elongated elements in the flow direction behind, the pin sleeves.

An essential structural simplification and a material saving can, however, be achieved compared with the arrangement of four elongated elements when two elongated elements are arranged in opposite directions from the midpoint on the connecting axis I and have a greater separation from the midpoint between the two pin sleeves than the two pin sleeves have and wherein the separation of the elongated elements in their course parallel to axis II lessens toward the connecting axis I. In this way, there occurs a centering of the flow with only two elements.

An advantageous robustness of the sensor and a lessening of the vibration susceptibility of the flow measurement can be achieved when the thickness of the elongated elements in their course on the cutting plane parallel to axis II increases toward the connecting axis. The increase of the thickness can preferably be at least 20%.

For an optimal centering of the flow at the region of the two pin sleeves, it is advantageous when the separation of two starting points of the two elongated elements on a connecting line extending parallel to the connecting axis is at least 30%, preferably 50%-120%, greater than the minimum separation two points of the elongated elements.

In a special embodiment of the invention, the two points, which define the minimum separation, are arranged on the connecting axis I.

Flow measuring devices can be secured on vibrating tubes. In order to improve the eigenoscillation of the sensor housing and to assure a greater robustness of the sensor e.g. against the bending of individual sensor elements, the elongated elements are advantageously connected together via a connecting element.

Especially advantageously in such case, the totality of the at least two elongated elements and the connecting element can form an arch, which bridges over the two pin sleeves. In this way, the pin sleeves are bordered and supplementally protected. With the application of an arch, one might think that flow turbulence would occur, which would influence the measuring. This has, however, not been found in the testing of the sensor housing.

The connecting element can additionally have a protrusion for draining droplets from the surfaces of the pin sleeves. This is especially advantageous in the case of the application of a thermal, flow measuring device for flow measurement of vapors or gases, which entrain liquid droplets in the gas stream.

A corresponding elongated element can advantageously be spaced from the nearest pin sleeve by at least 10% of the separation of the pin sleeves from one another.

The flow measuring device of the invention needs, due to its construction for bidirectional flow measurement, only calibration in one flow direction.

An arrangement of the invention includes a thermal, flow measuring device as claimed in one of the preceding claims and a pipe or tube, which is flowed through by a measured medium in a first flow direction, wherein the sensor housing of the thermal, flow measuring device is arranged in the pipe or tube and wherein the thermal, flow measuring device has an evaluation system, which is equipped for registering the flow of the measured medium in the first flow direction and in a second flow direction opposite to the first flow direction.

In combination with a direction detection, a flow-balancing of the medium in forward- and reverse directions can occur. Therefore, it is advantageous that the flow measuring device has a flow obstruction and a third pin sleeve with a second heater, which are arranged in such a manner that a direction detection of the measured medium can occur. In such case, the third pin sleeve is located preferably partially or completely in the flow shadow of the flow obstruction.

In such case, the flow obstruction can be, for example, a flat web or also a cylindrically or prismatically embodied pin sleeve. The terminology, flow shadow, means a shed wake region and/or a recirculation region. The heater can be arranged within this region, when the sensor is flowed on from a first flow direction.

Other advantageous embodiments of the flow measuring device and especially of the sensor housing will now be discussed.

A pin sleeve can advantageously have an additional section, which preferably transfers into the base, and which has a lateral surface, which has a maximum separation d2 about the longitudinal axis. In the case of a frustoconically shaped lateral surface, the maximum separation corresponds to the greatest radius of the lateral surface, which usually at the same time forms the fictive base of the frustum. This base, of course, does not exist, since the sleeve of the sensor housing is hollow all the way through, so that a temperature sensor at the time of assembly of the thermal, flow measuring device is introducible via the hollow body and a terminal opening of the pin sleeve into its pin-shaped lateral surface and can be led, or threaded, into the first section.

The first section can advantageously have a cylindrical lateral surface. In this way, compared to a cone shaped lateral surface, an especially good coupling of a heater or a temperature sensor with the inner surface of the pin sleeve can occur. The coupling can preferably occur by means of a copper bridge, such as described, for example, in DE 10 2008 015 359 A1.

In order that the individual sensor elements are especially well thermally decoupled and also produce only low flow turbulence, the maximum inner diameter of the first section is advantageously less than or equal to 4 mm, preferably less than or equal to 3 mm. Exactly in the case of these small diameters, there occur in the case of non-stepped pin sleeves, however, lower eigenfrequencies. These eigenfrequencies are advantageously increased by the stepped shape of the small pin shaped tube of the invention.

Each of the pin sleeves includes advantageously a terminal section with a medium-contacting end face. Arranged in the first pin sleeve, especially in the terminal section of this pin sleeve, is a heater and in the second pin sleeve, especially in the terminal section of this pin sleeve, is a temperature sensor for ascertaining the temperature of the medium. Certainly other heaters and/or further temperature sensors can be arranged in other pin sleeves. The heater and the temperature sensor serve typically for flow measurement.

Advantageously, the other section of the pin sleeve has a frustoconical-shaped, lateral surface. By conical embodiment of the section arranged toward the hollow body, supplementally, the eigenfrequency the pin sleeves is increased.

Advantageously, each of the pin sleeves has at least in the terminal section a wall thickness of less than 0.5 mm, preferably between 0.1-0.4 mm. The small wall thickness enables a very direct and fast heat transfer to the measured medium. In this way, fast response times of the sensor in the case of change of flow velocity of the measured medium are enabled. Thin pin sleeves also supplementally increase the eigenfrequency of the pin sleeves and the sensor housing as a whole. This is, however, compensated by the stepped shape of the pin sleeves of the invention.

The wall thickness varies advantageously at least in the region of the terminal section by less than 20%, preferably by less than 10%. In this way, an as uniform as possible heat distribution is achieved along the pin sleeves.

For stability under pressure and chemical stability, the sensor housing is advantageously composed of steel and/or titanium and/or Hastelloy.

The metal sensor housing can be embodied as one piece and the pin sleeves and the hollow body can be connected together seam freely, especially weld seam freely, wherein the sensor housing is especially preferably embodied as a monolithic component. Seam free means in the context of the present invention that neither a weld seam nor an adhesive- or solder seam is present as connection between the pin sleeves and the hollow body. In the case of welded pin sleeves, the heat transfers change with temperature, which, in the case of a greater temperature change, can lead to a measurement error. This is, however, advantageously prevented in the case of this embodiment.

Especially advantageously, the metal sensor housing is embodied as a monolithic component. The means that the sensor housing is manufactured completely of one material. While by generative manufacturing methods also combinations of a number of metals or metal alloys, e.g. steel and titanium, are implementable, these are not preferred.

Advantageously, at least the terminal section of the pin sleeves has a cylindrical lateral surface with a diameter and the terminal section extends over a length, wherein the ratio of length to diameter is greater than or equal to five, preferably greater than or equal to seven.

In order to supplement the thermal, flow measuring device with other functionalities, e.g. sensor drift detection and/or direction detection, the sensor housing advantageously includes at least a third pin sleeve and/or a flow obstruction, which preferably extend in parallel with first and/or second pin sleeves.

For reducing the eigenfrequency, the third pin sleeve advantageously has a longitudinal axis and an end face, wherein the third pin sleeve has a first section with the end face and a lateral surface, wherein the lateral surface has a maximum separation of d1 about the longitudinal axis, and the end face has an additional section, which transfers into the base, with a lateral surface, which has a maximum separation of d2 about the longitudinal axis, wherein the maximum separation d2 of the lateral surface of the additional section is at least 20%, preferably at least 50%, greater than the maximum separation d1 of the lateral surface of the first section about the longitudinal axis of the pin sleeve.

The length of the terminal section can advantageously be at least 2 mm, preferably 3-10 mm, and the total length of a pin sleeve is at least 10 mm.

The sensor housing of the flow measuring device of the invention can advantageously be produced by means of a generative manufacturing method, preferably by means of a radiation melting method. While corresponding sensor housing are also implementable via other manufacturing methods, thus e.g. by primary forming methods, especially metal injection molding, it has, however, been found that especially good manufacturing tolerances and especially thin walled components are attainable with the aforementioned preferred manufacturing methods.

BRIEF DESCRIPTION OF THE DRAWING

The invention will now be explained in greater detail based on examples of embodiments and with the help of the appended drawing. This description and the figures are by way of example and are not intended to limit the scope of protection of the present invention. The figures of the drawing show as follows.

DETAILED DESCRIPTION

Figure 1:
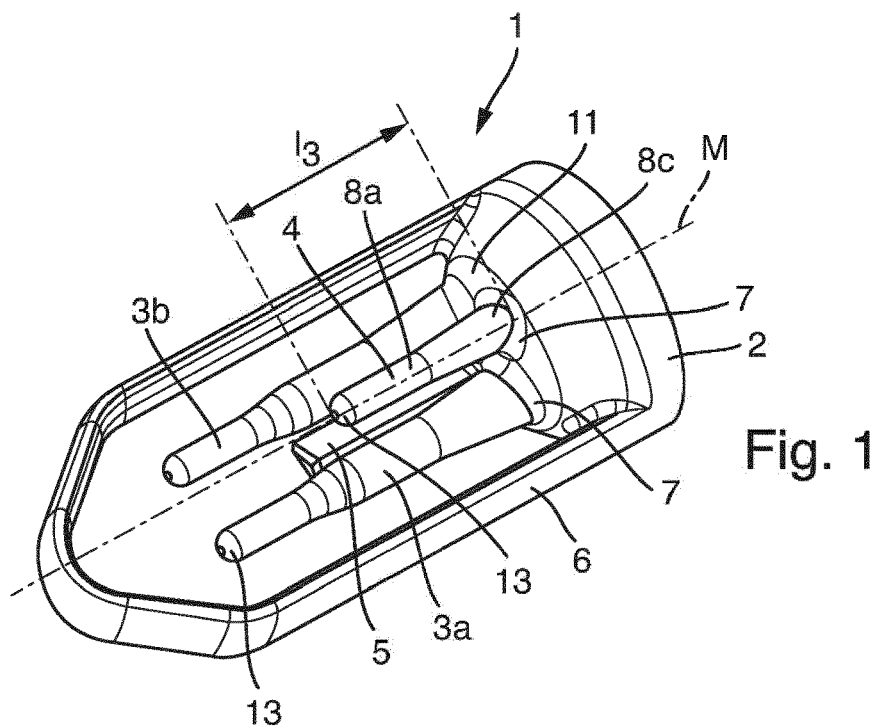
FIG. 1 shows a perspective view of a first embodiment of a sensor housing of a thermal, flow measuring device of the invention.

Conventional, thermal, flow measuring devices use usually two heatable resistance thermometers embodied as equally as possible, which are arranged in, most often, pin-shaped metal sleeves, so-called stingers or prongs, or in cylindrical metal sleeves, and which are in thermal contact with the medium flowing through a measuring tube or through the pipeline. For industrial application, the two resistance thermometers are usually installed in a measuring tube; the resistance thermometers can, however, also be directly mounted in the pipeline. One of the two resistance thermometers is a so-called active sensor element, which is heated by means of a heating unit. Provided as heating unit is either an additional resistance heater, or in the case in which the resistance thermometer is a resistance element, e.g. an RTD (Resistance Temperature Device) sensor, which is heated by conversion of an electrical power, e.g. by a corresponding variation of the measuring electrical current. In the field of thermal flow measurement, the active sensor element is also often called the heater. The second resistance thermometer is a so-called passive sensor element; It measures the temperature of the medium.

Usually, in a thermal, flow measuring device, a heatable resistance thermometer is so heated that a fixed temperature difference is established between the two resistance thermometers. Alternatively, it is also known to supply via a control unit a constant heating power.

If there is no flow in the measuring tube, then an amount of heat constant with time is required for maintaining the specified temperature difference. If, in contrast, the medium to be measured is moving, the cooling of the heated resistance thermometer depends essentially on the mass flow of the medium flowing past it. Since the medium is colder than the heated resistance thermometer, heat is transported away from the heated resistance thermometer by the flowing medium. In order thus in the case of a flowing medium to maintain the fixed temperature difference between the two resistance thermometers, an increased heating power is required for the heated resistance thermometer. The increased heating power is a measure for the mass flow of the medium through the pipeline. The heating power can be described by a so-called power coefficient PC.

If, in contrast, a constant heating power is supplied, then the temperature difference between the two resistance thermometers lessens as a result of the flow of the medium. The particular temperature difference is then a measure for the mass flow of the medium through the pipeline or through the measuring tube, as the case may be.

There is, thus, a functional relationship between the heating energy needed for heating the resistance thermometer and the mass flow through a pipeline, or through a measuring tube, as the case may be. The dependence of the heat transfer coefficient on the mass flow of the medium through the measuring tube, or through the pipeline, is utilized in thermal, flow measuring devices for determining the mass flow. Devices, which operate on this principle, are produced and sold by the applicant under the marks, 't-switch', 't-trend' and 't-mass'.

FIG. 1 shows details of a special variant of a thermal, flow measuring device. In such case, one sees especially the housing of a measuring transducer of a thermal, flow measuring device, which is referred to herein as sensor housing 1. The housing is of metal and can be embodied as a plug-in sensor or can be affixed securely, in given cases, with an intermediate piece, to the inner surface of a measuring tube.

In addition to the measuring transducer, the thermal, flow measuring device includes, of course, also an evaluation unit, which, however, for reasons of perspicuity, is not shown.

The sensor housing 1 to be described here represents only an especially preferred embodiment of the invention and is not intended to limit the scope of protection of the present invention.

Sensor housing 1 includes a hollow body 2, which can be fixed directly or via an intermediate piece to a holder of a plug-in apparatus, e.g. a plug-in rod, or to a measuring tube.

Hollow body 2 includes a plate-shaped base 11, extending from which at least two, a first and a second, pin sleeves 3a and 3b protrude into the lumen, thus into the interior of a pipe, for example, of the measuring tube.

Figure 2:
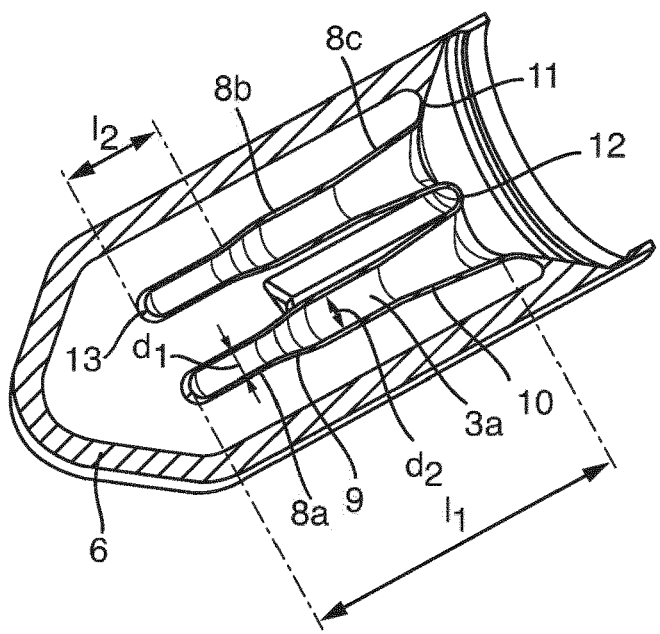
FIG. 2 shows a sectional view of the sensor housing of FIG. 1.
Figure 2A:
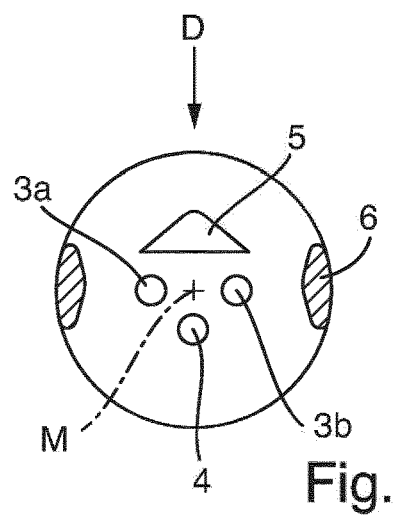
FIG. 2a shows a sectioned plan view of the sensor housing of FIG. 1.

Hollow body 2 is frustoconically shaped in the embodiment of FIGS. 1 and 2. It can, however, also have another shape, e.g. be cylindrical or truncated pyramid shaped.

Shown in FIGS. 1 and 2 are a total of four pin sleeves. This variant is preferable, since with this housing form a number of functionalities, e.g. drift detection and direction detection, can be advantageously constructively united in one thermal, flow measuring device.

At the same time, the embodiment of FIGS. 1 and 2 shows that in the context of the present invention also more complicated sensor housing variants are implementable.

The present invention can in a simplified embodiment also have only the two pin sleeves 3a and 3b. The pin sleeves are preferably connected with the hollow body as one piece and connecting seam free, especially in the connection region 12. A connecting seam in the sense of the present invention is a weld seam, adhesive seam, solder seam or the like. Especially preferably, the housing, thus the totality of pin sleeves and hollow body, is monolithically embodied.

The first and second pin sleeves 3a, 3b have, in each case, a medium-contacting end face 13. The end faces are rounded in FIGS. 1 and 2, but they can, however, also be flat.

Pin sleeves 3a and 3b can, in each case, be embodied in a stepped manner, whereby a better introduction and positioning of a heating element and/or a temperature sensor in the pin sleeves can occur through the terminal opening at the ends of the pin sleeves facing away from the medium contacting ends.

The geometric embodiment of a pin sleeve 3a or 3b is of such a character that starting from the end face 13, firstly, a first section 8a with cylindrical pin shaped sleeve wall and a first steady cylindrical surface diameter d1 follows. Then, there follows a second section 8b with a cylindrical pin shaped sleeve wall and a second steady cylindrical surface diameter d2. The transitional region between the first and second sections 8a and 8b is not abrupt, but, instead, includes a continually increasing diameter from the first diameter d1 to a second diameter d2. It is in the case of a corresponding stepping 9, consequently, not an abrupt but, instead, a gradual changing of the diameter. Then, the pin sleeves enter a transitional region 10 in a third section 8c, which is embodied frustoconically shaped and in the case of which the diameter d gradually grows over the course of the frustum to a transitional region 7 to the hollow body 2. The pin sleeves 3a and 3b have a length l1 of at least 10 mm.

End face 13 is according to the definition of the present invention associated with the section 8a. Arranged in this section 8a of a first of the two pin sleeves 3a and 3b is a heating element, or heater, (not shown). This can also be e.g. a heatable resistance thermometer. The heating element does not absolutely have to contact the end face or cylinder lateral surface of its pin sleeve but, instead, can preferably be thermally coupled with the wall of its pin sleeve via a copper bridge. The same holds also for additional, optional pin sleeves. A corresponding arrangement and its advantages are described in detail in DE 10 2008 015 359 A1.

Arranged in the section 8a of a second of the two pin sleeves 3a and 3b is a temperature sensor for ascertaining the temperature of the medium. This can likewise be embodied as a heatable resistance thermometer, wherein during operation of the thermal, flow measuring device preferably one of the resistance thermometers can be operated actively heated and one of the resistance thermometers unheated.

The wall thickness of the pin sleeves 3a and 3b amounts at least in the section 8a to less than 0.5 mm, preferably less than or equal to 0.4 mm, especially 0.1 to 0.4 mm. Due to the thin wall thickness, an especially favorable heat transfer can be achieved, The length l2 of this section 8a can be at least 2 mm, preferably, however, 3-10 mm.

The ratio of the length l2 for the diameter d1 for the first section 8a is preferably greater than 5, especially preferably equal to or greater than 7.

In a preferred embodiment of the invention, the average ratio $l1/d_{average\ value}$ for an entire pin sleeve amounts preferably to greater than 4, wherein the diameter always refers to the particular length of the section of the pin sleeves, in which the diameter is actually present. In the case of a frustum, such as in section 8c, an averaging of the diameter can occur.

The housing 2 is manufactured of metal. As especially preferred metal, steel can be utilized. Alternatively, e.g. for strongly-corrosive media, also titanium can be utilized as wall material.

Additionally, the housing can be provided with a metal external coating, in order, in given cases, to increase the resistance against certain media. This external coating according to the present invention is, however, not the housing 2, but, instead, a material ply applied supplementally on the housing.

Different from the above-described basic form for a thermal, flow measuring device, the embodiment shown in FIGS. 1 and 2 includes a flow disturbance, or flow disturbing element, 5, which can be embodied as a pin sleeve or as a solid element, as well as a third pin sleeve 4.

The flow disturbance 5 exhibits compared with the first two pin sleeves 3a and 3b at least in an end region with an end face another geometric cross sectional shape. Especially, the end region with the end face is prismatically embodied. In the embodiment of FIGS. 1 and 2, the cross sectional shape is triangular. The flow disturbance 5 is arranged in the illustrated first flow direction D in front of the third pin sleeve 4.

The first and second sensor sleeves form a shared connecting axis. The first flow direction D is defined in such a manner that it is arranged at an angle of 80-100° to the connecting axis, on a plane, which extends perpendicular to the longitudinal axes of the two aforementioned sensor sleeves and on which the connecting axis lies. The measured medium strikes in the first flow direction, firstly, on the flow obstruction 5. The third pin sleeve 4 lies partially or completely in the flow shadow of this flow obstruction 5.

Depending on positioning of the sensor in the flow of medium, there can be, instead of the first flow direction D, also a second flow direction (not shown), which is opposite to the first flow direction D. In this flow direction, the third pin sleeve is directly flowed against.

The third pin sleeve 4, as arranged in such a manner and which likewise has a heater, can be utilized for direction detection.

The general method for flow direction detection is described in the documents DE 10 2009 045 956 A1 and DE 10 2010 040 285 A1, to which comprehensive reference is taken in the context of the present invention.

There occurs, in such case, the ascertaining of a decision coefficient DC based on two power coefficients, thus power coefficients PC1 and PC2. In the present case, this concerns a power coefficient PC1 for the heater in one of the pin sleeves 3a or 3b and a second power coefficient for the heater in the third pin sleeve 4. The decision coefficient is ascertained as follows: DC=(PC2−PC1)/PC2. By reconciliation of the decision coefficient with a limit value, it then can be decided, from which direction the flow D flows through a pipe, or measuring tube, as the case may be. Clearly, the power coefficient of the heater of the third pin sleeve will change, depending on whether the pin sleeve is located in the flow shadow of the flow obstruction 5 or whether it is directly flowed on.

As one detects from FIGS. 1 and 2, the third pin sleeve 4 has a lesser total length l3 compared with the total length of the first and second sleeves 3a and 3b. The sleeve includes, analogously to the pin sleeves 3a, 3b, an end face 13, which is associated with a first cylindrical section 8a of the pin sleeve 4. Following on this first section is a third section 8c, which is embodied conically analogously to the sleeves 3a and 3b. A second cylindrical section 8b is missing in the case of this pin sleeve. Arranged in this shorter third pin sleeve 4 is likewise a heater, e.g. a heatable resistance thermometer. Additionally, the flow obstruction 5 also has a lesser total length l3 than the total length l1 of the first and second pin sleeves 3a and 3b. By having different planes perpendicular to the longitudinal axes of the pin sleeves where the heaters are arranged, the flow measurement is not influenced by the direction detection.

It is understandable that the shorter, third pin sleeve 4 also has another degree of soiling. Therefore, ratio formation of e.g. the power coefficient of the heater in the first or second pin sleeve 3a, 3b with the heater in the third pin sleeve 4 can provide an estimate of the sensor drift over the operating time of the thermal, flow measuring device. In given cases, a quantifying of the sensor drift can occur and especially preferably a compensating of the sensor drift for the flow measurement.

To the extent that the flow obstruction 5 is utilized as a sensor sleeve, a heater, i.e. a heating element, preferably a heatable resistance thermometer, can also be inserted into this sensor sleeve. Just due to the different geometric shape, another soiling behavior of this pin sleeve is to be expected and therewith another sensor drift in the course of the duration of operation of the thermal, flow measuring device. For example, by forming the differences of the power coefficients of the different heating elements, these can be compared, in order to detect by what percent the differences change during measurement operation, so that sensor drift can be reliably detected and compensated.

According to the invention, housing 1 includes an arch 6, which curves around the arrangement of the first and second pin sleeves 3a, 3b, the optional fourth pin sleeve 4 and the pin-shaped element 5 and is likewise connected with the hollow body 2 preferably monolithically and seam freely. This arch serves preferably as a flow guiding element.

A monolithic sensor housing with at least two correspondingly long, thin walled pin sleeves is additionally a manufacturing challenge. By means of lost wax casting, corresponding structures are manufacturable in cost- and time consuming manner. The used metal materials must also be suitable for casting. For successful lost wax casting, attention must be paid to many aspects, such as the cooling speed, and, in given cases, reworking steps for surface preparation. Similar disadvantages occur also in the case of primary forming methods, e.g. the so-called Metal Injection Molding, which basically can also be utilized in the context of invention for manufacture of the sensor housing. A special advantage of the MIM method is a comparatively high manufacturing speed.

Especially preferred are generative manufacturing methods, such as radiation melting methods, such as e.g. selective laser melting, also known as the SLM method, in order to manufacture such objects with correspondingly thin wall thickness and corresponding length of the pin sleeves.

In the case of the SLM method, a metal powder is applied in a thin layer on a surface. The metal powder is then locally completely melted by laser radiation and solidified to a solid material layer with a coating thickness of typically 15-150 μm. Then, the surface is lowered by the magnitude of the coating thickness and a new material layer applied. In this way, the housing 1 of the measuring transducer is gradually formed. Material stresses and corrosion susceptible seam locations do not form in such case.

In the case of the examples of embodiments in FIGS. 3-9, different embodiments of the thermal, flow measuring device of the invention have different arch variants.

FIGS. 3-6 show four different sensor housing variants using cross sections perpendicular to a sensor axis A. One detects always the cross sections of the two pin sleeves 23a and 23b, of which one pin sleeve is provided with a heater and the second pin sleeve with a temperature sensor for ascertaining the temperature of the medium. Of course, the sensor housing can have other pin sleeves or flow impediments for direction- and/or sensor drift detection. These are, however, for reasons of perspicuity, not shown in the present examples of application.

Figure 3:
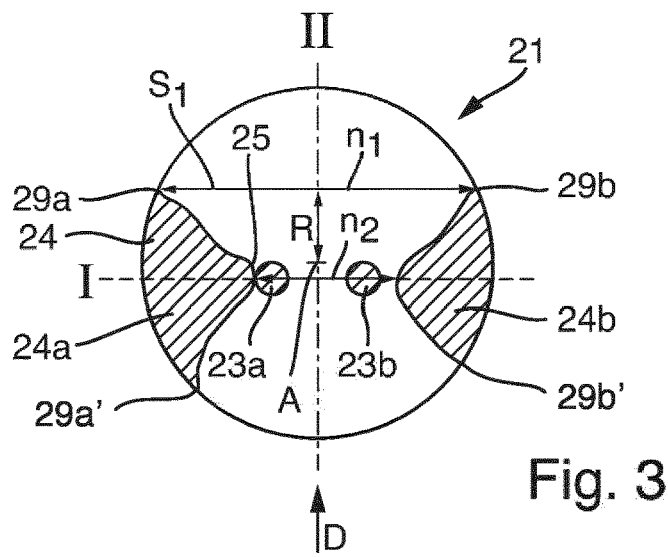
FIG. 3 shows a sectional view of a second embodiment of a sensor housing with a cutting plane perpendicular to the longitudinal axis of the sensor housing.

FIG. 3 shows the arch 24, in particular the elongated elements 24a, 24b of the arch 24 extending in parallel with the pin sleeves. The connecting axis I between the two pin sleeves 23a and 23b is likewise shown in FIG. 3, as well as an axis II, which extends perpendicularly to the connecting axis in the sectional view of the FIG. 3. The cross section of each of the elongated elements 24a, 24b includes a beginning- and an endpoint 29a, 29a', 29b, 29b'. A connecting line S1 of the starting points 29a, 29b of the two elongated elements 24a and 24b extends in parallel with connecting axis I and has the greatest possible separation R along the axis II from a connecting line between two points of the two elongated elements.

The separation of the starting points, or alternatively the end points, along the connecting line S1 defines a distance n1. By parallel displacement of the connecting line S1 in the direction of the sensor axis A, the separation n decreases between the points, which are arranged lying opposite on the outline or contour of the two elongated elements 24a and 24b and on a correspondingly parallel shifted connecting line.

Figure 4:
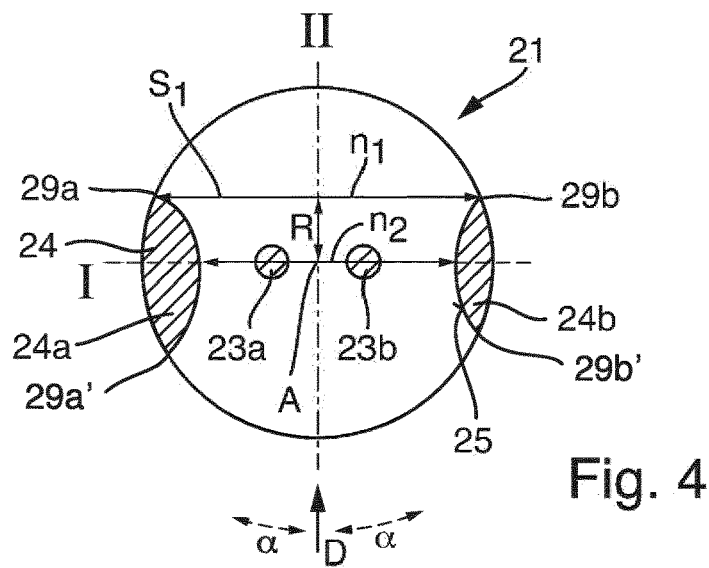
FIG. 4 shows a sectional view of a third embodiment of a sensor housing with a cutting plane perpendicular to the longitudinal axis of the sensor housing.
Figure 5:
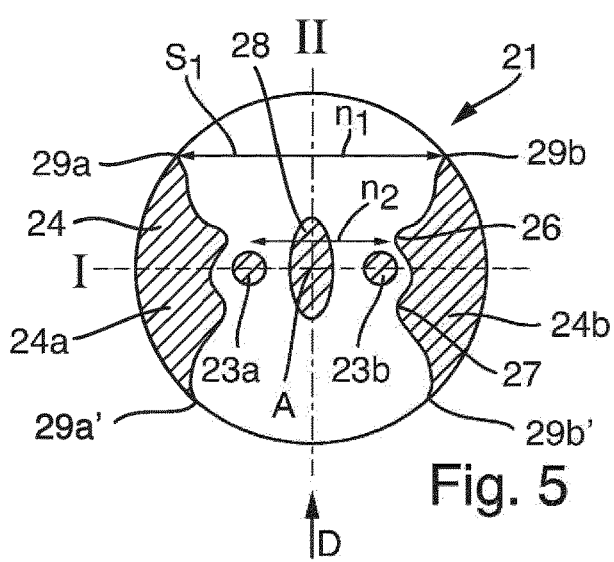
FIG. 5 shows a sectional view of a fourth embodiment of a sensor housing with a cutting plane perpendicular to the longitudinal axis of the sensor housing.

Simply stated, the separation of the elongated elements 24a and 24b of the arch 24 parallel to the connecting axis I of the pin sleeves lessens, until a minimum separation n2 of two points 25 is reached, of which the points 25 are located on the elongated element 24a and 24b, respectively. These points 25 are the mutually nearest points of the two elongated elements This minimum separation n2 lies in FIGS. 3 and 4 and 6 on the connecting axis I. In FIG. 5, there are two minimum separations n2, whose connecting lines have the same separation from the connecting axis I.

This embodiment serves for collecting the flow, respectively for flow guidance, to the sensor middle, thus toward the two pin sleeves. Usually, a thermal, flow measuring device should be so installed in a tube or pipe that the flow of the measured medium is at an angle of 90° to the connecting axis I. However, this cannot always be assured. It can occur that the flow direction strikes the sensor housing at a certain angular offset from the 90°-configuration. This angular offset is schematically indicated in FIG. 4 with the letter α. Usually, the flow measurement of the thermal, flow measuring device in the case of occurrence an angular offset is burdened with a measurement error. This is often also referred to as the tilt angle sensitivity of the thermal flow sensor. Due to the illustrated flow guidance, however, the tilt angle sensitivity is significantly reduced, so that the measurement error in the case of a flow with an angular offset from the 90°-configuration of at least ±7 degree can be significantly lessened.

As evident from FIGS. 3-6, the sensor elements have two symmetry planes, wherein a first symmetry plane is defined by the connecting axis I and the sensor axis A and wherein the second symmetry plane is defined by the axis II and the sensor axis A.

In this way, the installed position of the sensor on a tube is independent of whether the medium flows through the tube in the flow direction D or counter to this flow direction. Additionally, the sensor in the case of its calibration needs to be calibrated only for one direction.

The elongated elements 24a and 24b can in a less preferred embodiment of the invention be arranged as in FIGS. 3-6 but not be terminally connected together in the form of an arch.

Analogously to FIGS. 1-2, FIGS. 7-9 show variants of a sensor housing 31. These have an arch 34 with a connecting piece 36, which connects two elongated elements 35 to form an arch 34, which bridges over the two pin sleeves 33a and 33b. In this way, the sensor is robust against vibrations e.g. in the installed state in the pipe or tube.

Figure 6:
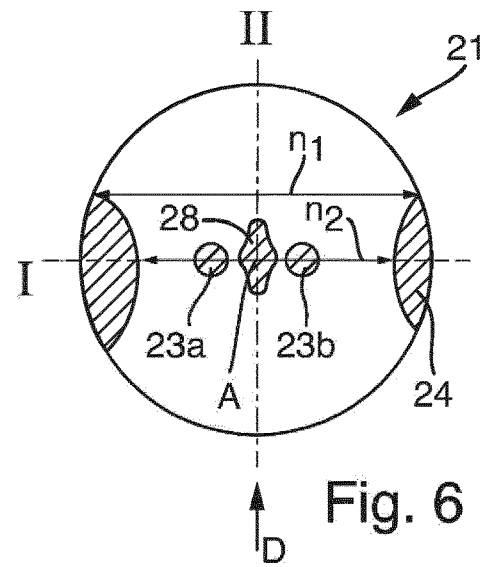
FIG. 6 shows a sectional view of a fifth embodiment of a sensor housing with a cutting plane perpendicular to the longitudinal axis of the sensor housing.
Figure 7:
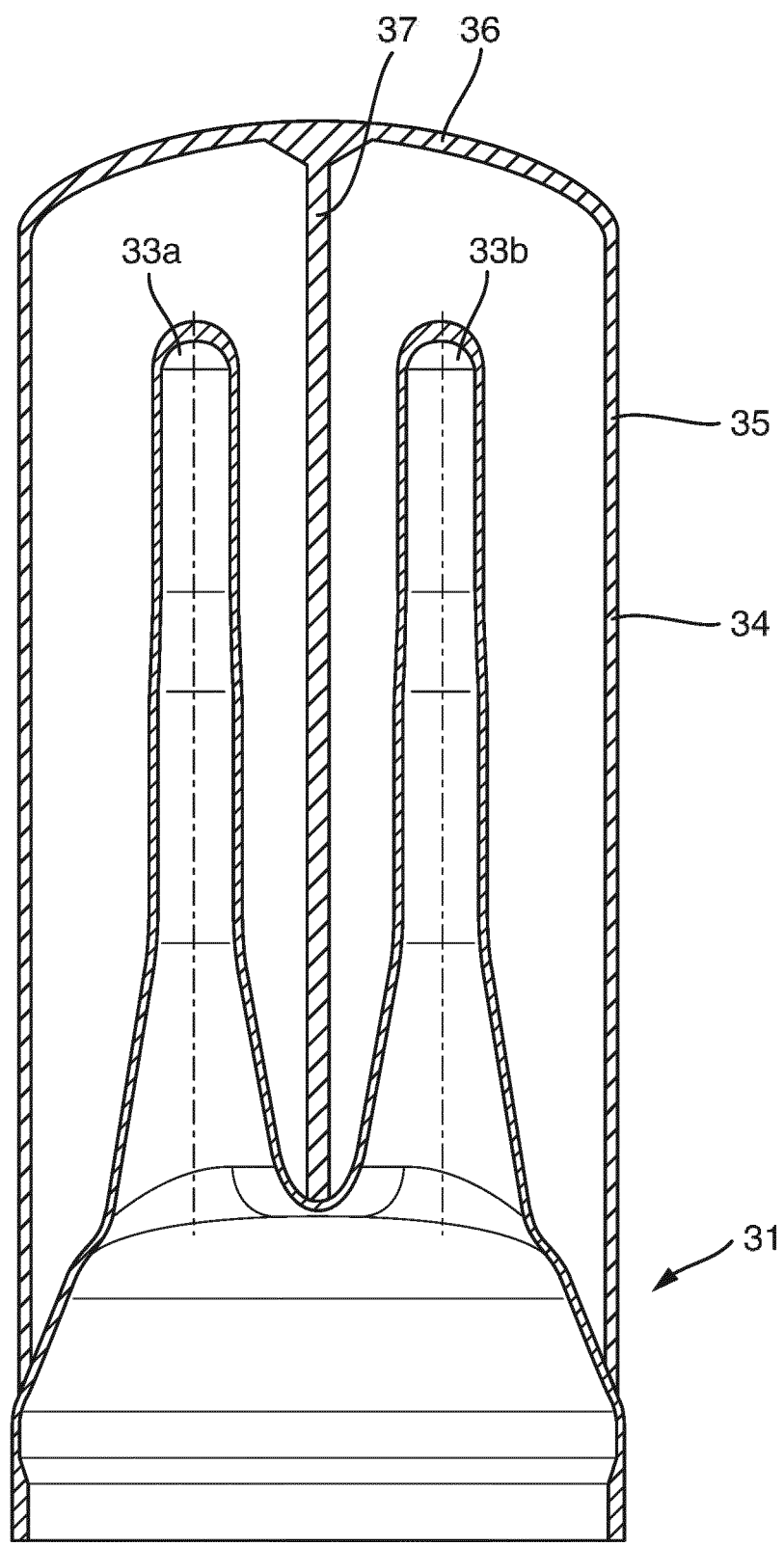
FIG. 7 shows a longitudinal section of a sixth embodiment of a sensor housing of a flow measuring device of the invention.
Figure 8:
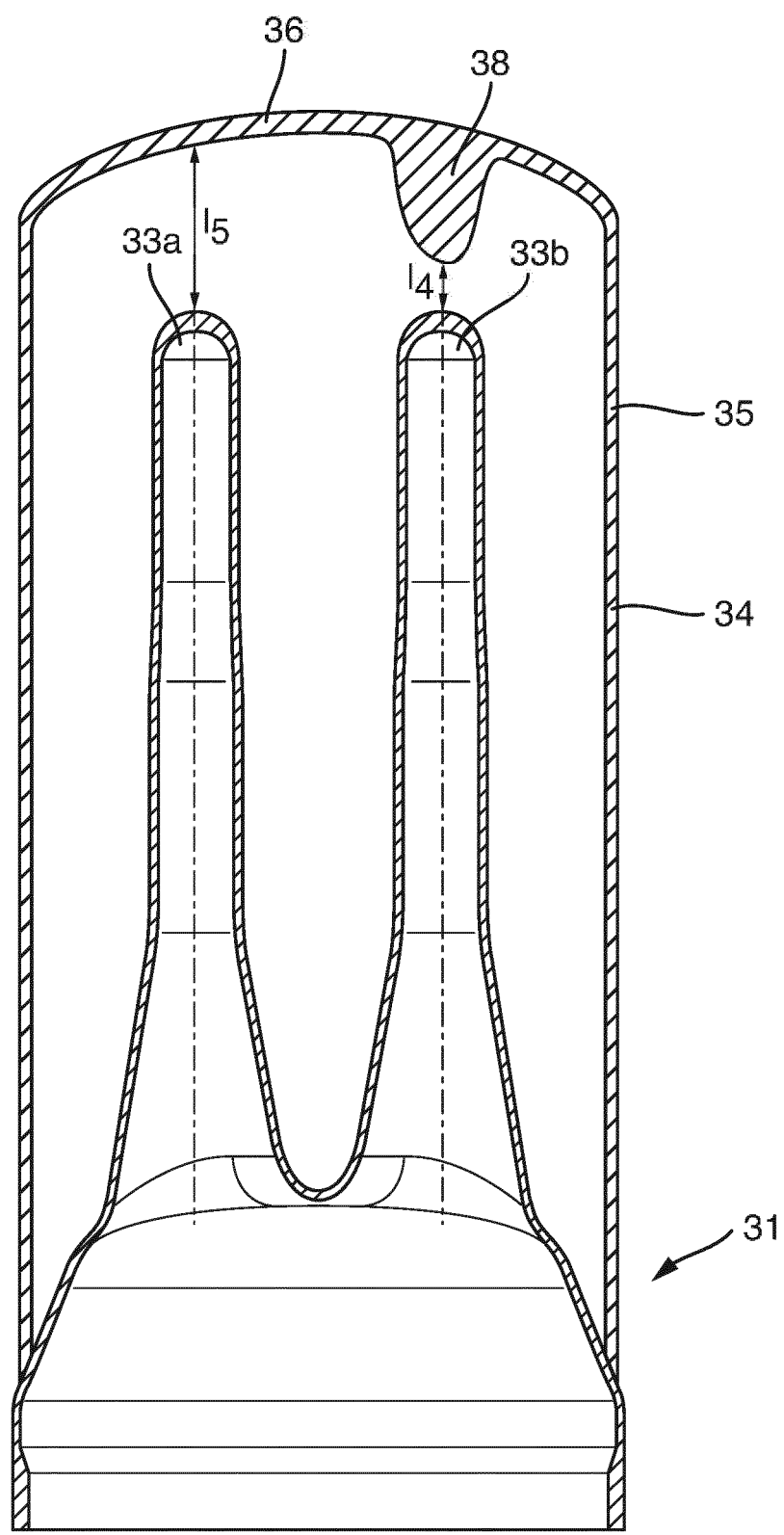
FIG. 8 shows a longitudinal section of a seventh embodiment of a sensor housing of a flow measuring device of the invention.
Figure 9:
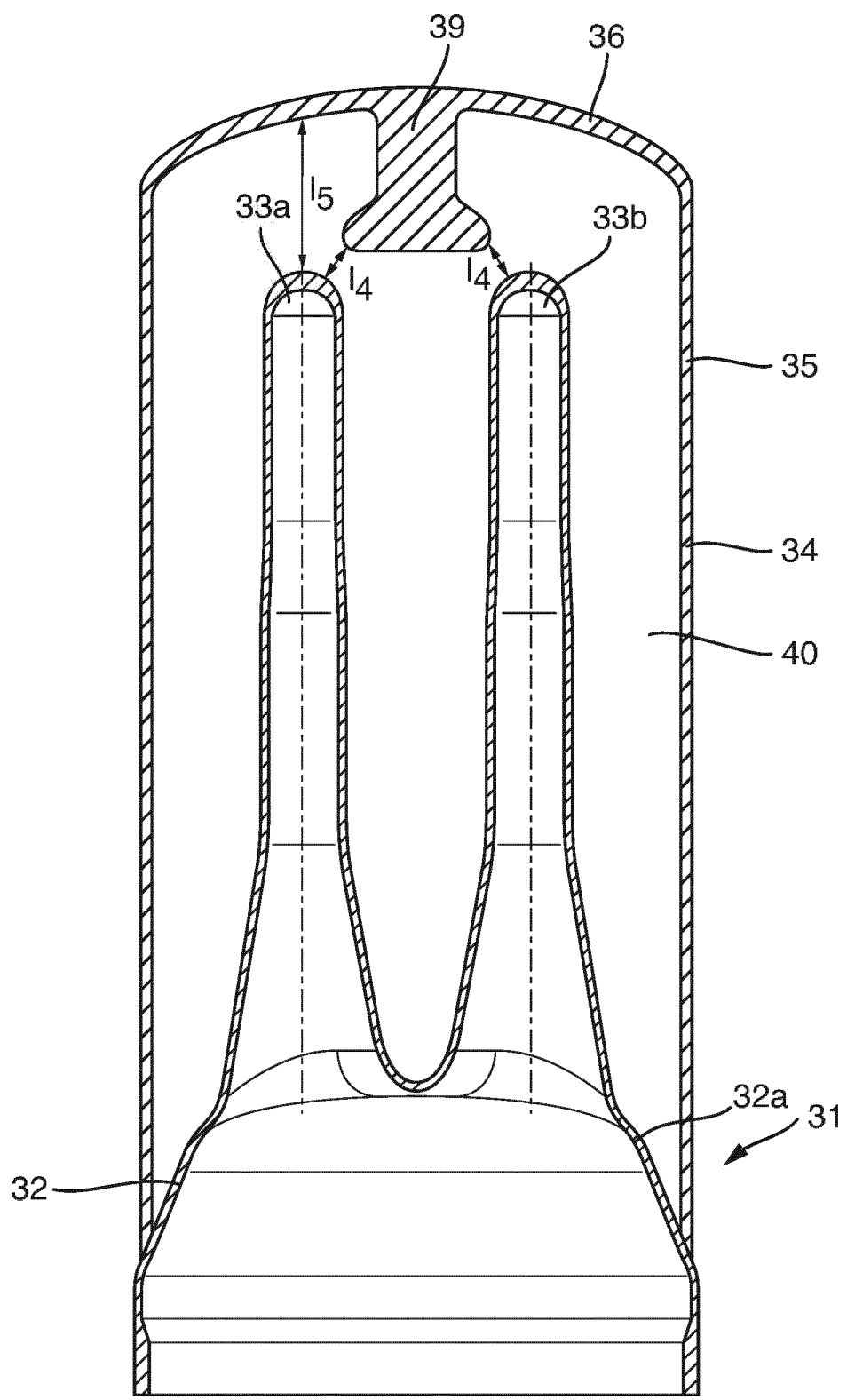
FIG. 9 shows a longitudinal section of an eighth embodiment of a sensor housing of a flow measuring device of the invention.

The elongated elements 35 illustrated in FIGS. 7-9 are only shown schematically. The cross section perpendicular to the sensor axis A of the elongated element 35 of FIGS. 7-9 can advantageously be selected from the variants illustrated in FIGS. 3-6.

FIGS. 5 and 6 have, in each case, a middle web 28, which in FIG. 5 has an elliptical cross section. In FIGS. 5 and 6, the cross section of the middle web increases in the direction of the sensor axis A. The maximum cross section must, however, not absolutely lie on the connecting axis I, but, instead, in each case, for the middle web two maximum cross-section lengths can be provided 28, which are arranged with the same separation and in parallel with the connecting axis I.

Correspondingly, the aforementioned middle web 28 of FIGS. 5 and 6 is shown schematically in FIG. 7 as middle web 37. The middle web likewise provides an improved flow guidance. The sensor housing is additionally then more robust against vibrations and the tendency for plugging between the pin sleeves is lessened.

FIGS. 8 and 9 show protrusions 38 and 39, respectively.

In FIG. 8, protrusion 38 has a minimum separation 14 from the end face of the pin sleeve 33b, which is less than the separation 15 of the end face from the connecting piece 36 of the arch 34 in the direction of the axis of the pin-shaped sleeve 33a. Preferably, the separation 14 is at least 20%, preferably 50%, less than the separation 15. The pin sleeve 33b is, in such case, the pin sleeve, which is provided with the heater.

FIG. 9 shows a symmetric protrusion 39. This defines minimum separations 14 to the end faces of the pin sleeves 33a and 33b, which are less than the separation 15 of the end faces from the connecting piece 36 of the arch 34 measured along the pin-shaped sleeve axes. Preferably, the separation 14 is at least 20%, preferably 50%, less than the separation 15.

Both protrusions in the case of an arrangement of the thermal, flow measuring device in a tube are oriented counter to the direction of the gravitational field and serve for the draining of liquid drops, which can form on the pin sleeves e.g. in the case of gas- and/or steam measurements. These drops can due to the small lengths 14 jump to the neighboring protrusion, so that they are conducted over and, finally, away. This prevents measurement error from drops on the pin sleeves.

In the preferred embodiment illustrated in FIG. 8, the protrusion is spaced from the pin sleeve. Especially preferably, in this preferred embodiment, the separation of the protrusion from the pin sleeve can be less than 20% of the length of the pin sleeve and especially less than 10% of the length of the pin sleeve.

In an additional preferred embodiment, there can be arranged between the protrusion and the pin sleeve a bridging element, which connects the protrusion with the pin sleeve. This is shown in FIG. 10.

Figure 10:
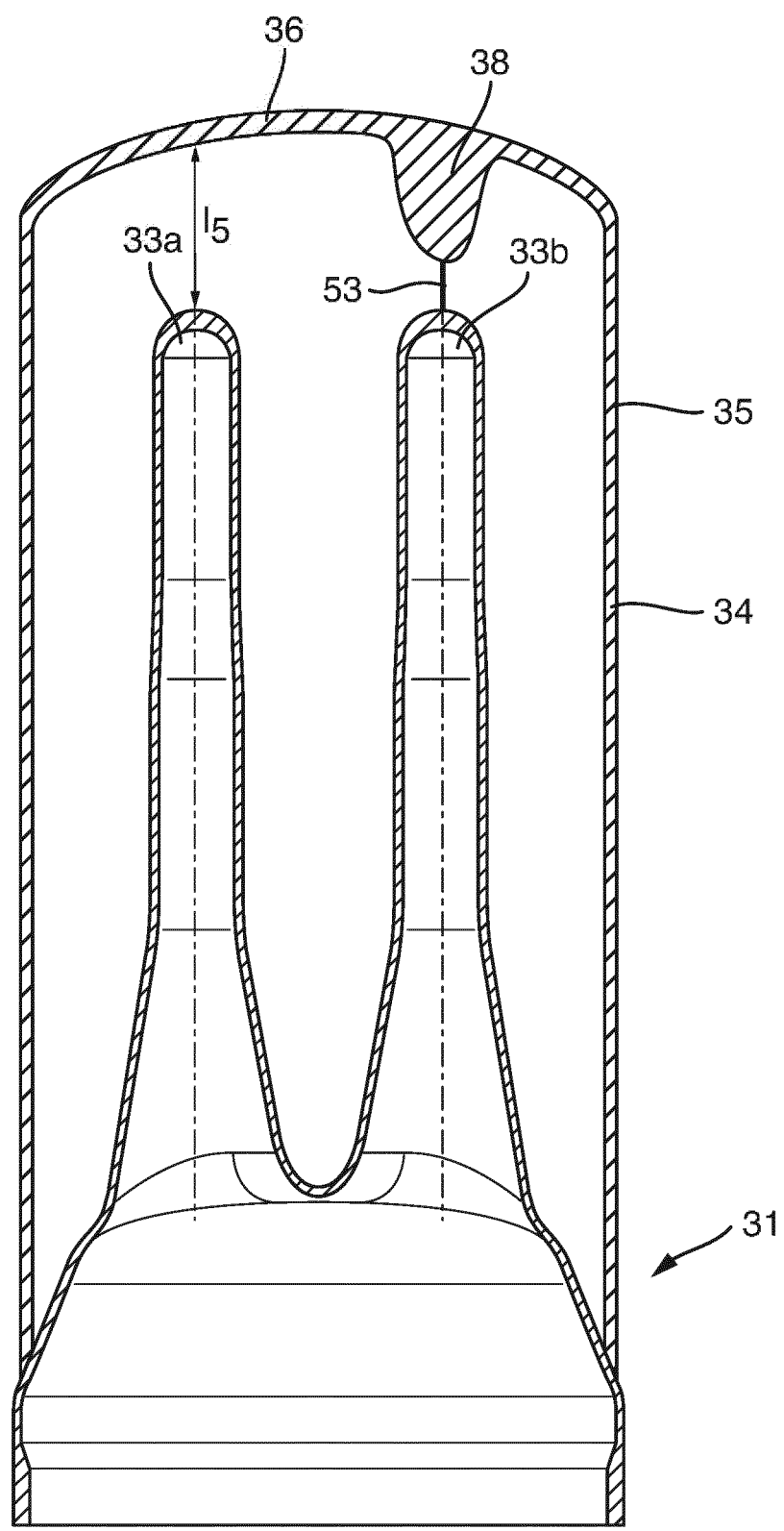
FIG. 10 shows a longitudinal section of a ninth embodiment of a flow measuring device of the invention.

FIG. 10 shows an embodiment of FIG. 8 modified in the context of invention. In such case, a bridging element 53 is arranged between the protrusion 38 and the pin sleeve 33b.

Protrusion, bridging element and pin sleeve can be embodied as components of a monolithic sensor housing or of a sensor housing component and especially preferably be connected seamlessly together. The bridging element 53 has, in such case, a very small contact area with the pin sleeves, which preferably corresponds to less than ⅕, especially preferably less than 1/10, of the end face area of the pin sleeves.

The bridging element 53 can be, for example, a wire. It serves for added removal of the drops.

The invention claimed is:

1. A thermal, flow measuring device, comprising:
   a metal sensor housing having a hollow body and a longitudinal axis, the hollow body having a base, wherein the hollow body is embodied to connect to a plug-in apparatus and/or to a tube or pipe wall;
   a first pin sleeve and a second pin sleeve disposed within the sensor housing and protruding from the base, wherein the first pin sleeve and the second pin sleeve define a connecting axis and a midpoint between the two pin sleeves;
   a first heater disposed within the first pin sleeve and a temperature sensor disposed within the second pin sleeve, wherein the temperature sensor is embodied to ascertain a temperature of a medium; and
   at least two elongated elements disposed within the sensor housing and extending from the hollow body in parallel with the two pin sleeves, wherein the at least two elongated elements have at least the same length as the two pin sleeves,
   wherein on a cutting plane perpendicular to the sensor housing longitudinal axis another axis extends that is perpendicular to the connecting axis, wherein the separation of the elongated elements in their course parallel with the axis lessens at least in certain regions, and wherein the sensor housing has two mirror symmetric planes that are perpendicular to one another and perpendicular to the cutting plane.

2. The thermal, flow measuring device as claimed in claim 1, wherein the at least two elongated elements are arranged in opposed directions from the midpoint of the connecting axis and have a greater separation from the midpoint between the two pin sleeves than the two pin sleeves have.

3. The thermal, flow measuring device as claimed in claim 1, wherein the thickness of the elongated elements in their course on the cutting plane parallel to the axis increases toward the connecting axis, at least in certain regions.

4. The thermal, flow measuring device as claimed in claim 1, wherein the separation of two starting points of the at least two elongated elements on a connecting line extending parallel to the connecting axis is at least 30% greater than the minimum separation of two points of the elongated elements.

5. The thermal, flow measuring device as claimed in claim 4, wherein the separation of two starting points is 50% to 120% greater than the minimum separation of two points of the elongated elements.

6. The thermal, flow measuring device as claimed in claim 4, wherein the two points that define the minimum separation are arranged on the connecting axis.

7. The thermal, flow measuring device as claimed in claim 1, wherein the at least two elongated elements are connected together via a connecting element.

8. The thermal, flow measuring device as claimed in claim 7, wherein the totality of the at least two elongated elements and the connecting element form an arch that bridges over the two pin sleeves.

9. The thermal, flow measuring device as claimed in claim 8, wherein the connecting element has a protrusion for draining droplets from the surface, including from an end face, of the pin sleeves.

10. The thermal, flow measuring device as claimed in claim 1, wherein each elongated element is spaced from the nearest pin sleeve by at least 10% of the separation of the pin sleeves from one another.

11. The thermal, flow measuring device as claimed in claim 1, further comprising:
    a flow obstruction;
    a third pin sleeve; and
    a second heater, the second heater disposed within the third pin sleeve,
    wherein the flow obstruction and the third pin sleeve are arranged to enable a direction detection of the measured medium.

12. An arrangement, comprising:
    a thermal, flow measuring device, including:
      a metal sensor housing having a hollow body and a longitudinal axis, the hollow body having a base, wherein the hollow body is embodied to connect to a plug-in apparatus and/or to a tube or pipe wall,
      a first pin sleeve and a second pin sleeve disposed within the sensor housing and protruding from the base, wherein the first pin sleeve and the second pin sleeve define a connecting axis and a midpoint between the two pin sleeves,
      a first heater disposed within the first pin sleeve and a temperature sensor disposed within the second pin sleeve, wherein the temperature sensor is embodied to ascertain a temperature of a medium, and
      at least two elongated elements disposed within the sensor housing and extending from the hollow body in parallel with the two pin sleeves, wherein the at least two elongated elements have at least the same length as the two pin sleeves,
      wherein on a cutting plane perpendicular to the sensor housing longitudinal axis another axis extends that is perpendicular to the connecting axis, wherein the separation of the elongated elements in their course parallel with the axis lessens at least in certain regions, and wherein the sensor housing has two mirror symmetric planes which are perpendicular to one another and perpendicular to the cutting plane; and
    a pipe or tube, which is flowed through by a measured medium in a first flow direction,
    wherein the sensor housing of the thermal, flow measuring device is arranged in the pipe or tube and wherein the thermal, flow measuring device further includes an evaluation system equipped for registering the flow of the measured medium in the first flow direction and in a second flow direction opposite to the first flow direction.

* * * * *